United States Patent Office

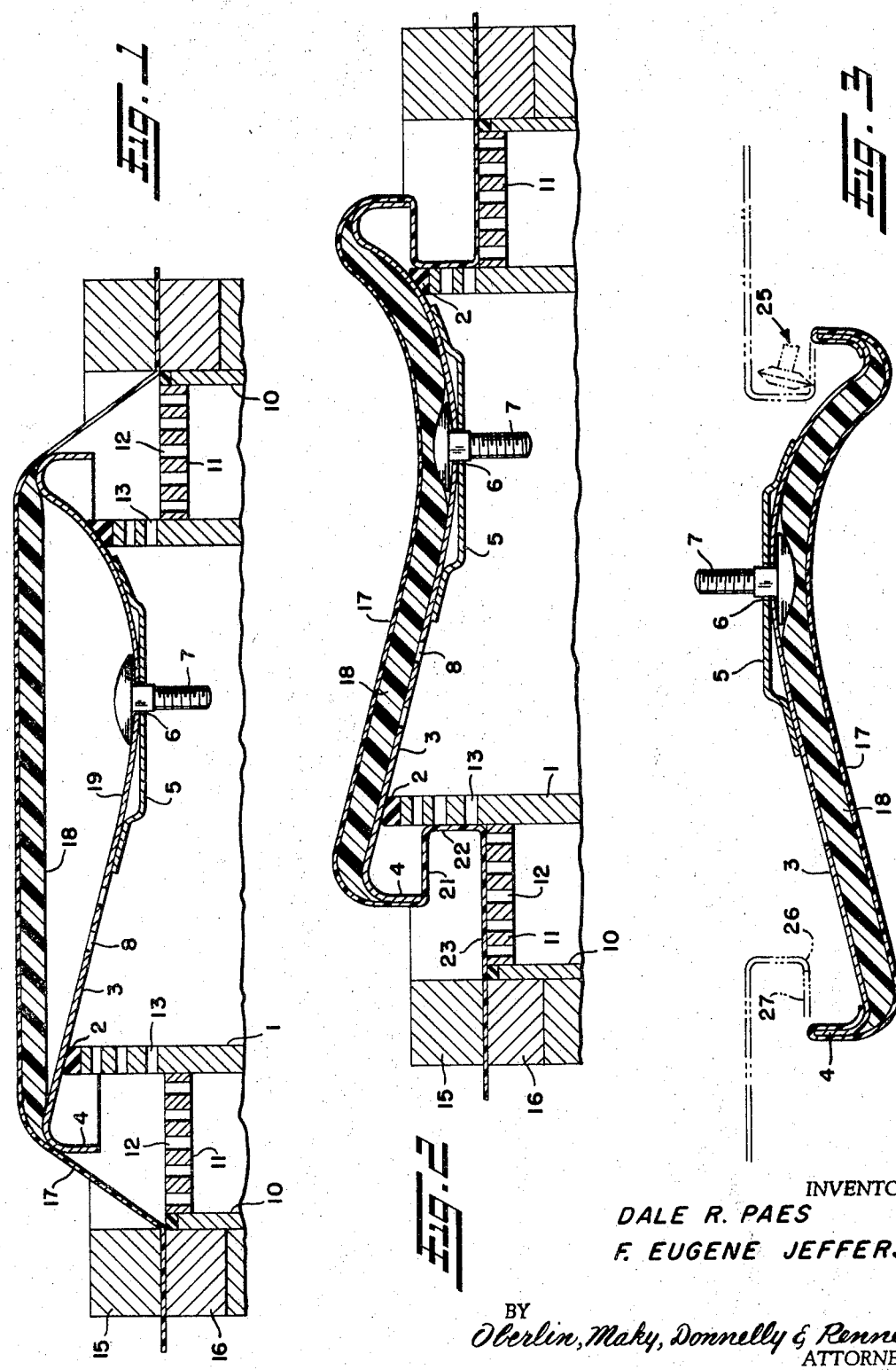

3,441,315
Patented Apr. 29, 1969

3,441,315
SEAT AND METHOD FOR MANUFACTURING THE SAME
Dale R. Paes, Mansfield, and F. Eugene Jeffers, Shelby, Ohio, assignors to Artnell Company, Chicago, Ill., a corporation of Delaware
Filed July 7, 1967, Ser. No. 651,866
Int. Cl. A47c 7/02
U.S. Cl. 297—458    9 Claims

ABSTRACT OF THE DISCLOSURE

A seat and process for manufacturing the same including a preformed base with a depending flange having an adhesively coated porous cushion material placed thereon which sub-assembly is positioned right side up on a supporting male mold pedestal in a vacuum forming machine, a peripherally clamped preheated sheet of cover upholstery material is draped thereover and vacuum formed over the sub-assembly and inwardly beneath the depending flange assembling and shaping both the cover and cushion material to the base; the seat is then removed from the machine, turned upside down and the cover is trimmed adjacent the corner formed by the periphery of the pedestal and the inwardly projecting edge of the cover is adhered to the interior of the depending flange to form the finished seat.

---

This invention relates generally, as indicated, to a seat and method of manufacturing the same and more particularly to a seat in which the upholstery material can very quickly be assembled and properly formed with the base.

In the upholstering of seating and particularly vehicle seats, much manual operation is usually required. The components of the seating generally require to be manually shaped and stretched. There is usually a substantial amount of tacking, gluing, trimming, and other such manual operations in the upholstering of seats.

With the present invention, the seat upholstery material is assembled with and shaped to conform to the underlying base in a single simple machine operation.

It is accordingly a principal object of the present invention to provide a unique vehicle seat wherein the cover material is pressure formed and assembled with the base in a single operation.

Another important object is the provision of a vehicle seat which is economically manufactured and which is as durable as the materials employed.

Another principal object is the provision of a method of manufacturing a seat utilizing a pressure forming operation both to shape and assemble the upholstery material to the base of the seat.

Another object is the provision of a method and apparatus for manufacturing seats wherein the components can quickly and easily be assembled into a finished seat having both the noted durable characteristics as well as a neat appearance.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principles of the invention may be employed.

In said annexed drawing:

FIG. 1 is a fragmentary vertical section illustrating a vacuum forming machine supporting the sub-assembly of the cushion and base of the seat prior to the pressure forming of the upholstery material and the assembly of such material to the base and cushion material;

FIG. 2 is a view similar to FIG. 1 illustrating the upholstery cover material formed about the cushion and base and assembled thereto; and FIG. 3 is a vertical section of the seat illustrating the final trimming and assembly operation.

Referring now more particularly to FIG. 1, there is illustrated a vacuum forming machine which includes a male mold pedestal 1 which may be of rectangular, oval or circular shape and the top edge is provided with a rubber seal 2 secured thereto forming a support for metallic pan or seat base 3 which is preformed and provided with a depending peripheral flange indicated at 4. A mounting base 5 is secured to the underside of the base 3 and both the seat base 3 and the mounting base 5 are provided with aligned square apertures indicated at 6 to receive carriage bolt 7. The carriage bolt 7 fits loosely within the apertures 6 and the clearance between the apertures and the square portion of the shank of the bolt provides air passage through the base. Additional air passages may be provided in the base as indicated at 8.

The seat illustrated may be employed as a tractor seat of the type used on riding lawn tractors and the like and in the finished seat a nut will be employed in conjunction with the carriage bolt 7 to secure the seat to a pedestal in which the mounting base 5 will be seated. It will, however, be appreciated that other types of seats may be made by the illustrated process.

The vacuum forming machine includes an outer wall 10 and a bridge or filling plate 11 extends between the outer wall and the male mold pedestal 1. Both the filler plate 11 and that portion of the male mold pedestal above the filler plate may be provided with perforations as indicated at 12 and 13, respectively. A clamping fixture comprised of top and bottom rings 15 and 16 fits peripherally about the outer wall 10 of the vacuum forming machine and is employed to clamp a sheet of upholstery or cover material 17. When the clamping fixture is in position on the machine as indicated in FIG. 1, a vacuum seal will be produced between the outer wall 10 and the sheet of cover material.

The sheet 17 of cover material is preferably vinyl although any thermo-formable material may be employed such as ABS (acrylonitrile-butadiene-styrene), or foam sheet materials. Such sheet material will be preheated by placing the same within the clamping fixture adjacent heating lamps, coils, or the like in conventional vacuum forming procedures. Prior to the drape forming of the sheeting over the seat base 3 as seen in FIG. 2, a precut filler or cushioning material 18 is positioned on top of the base. The cushioning material must be flexible and porous and a variety of padding or batt type materials is suitable and, of course, porous foams such as latex foam rubber are suitable. The cushioning material 18 due to its flexible nature may tend to sag somewhat more than the illustrated filler material, but in any event, it will not conform generally to the preformed contoured base illustrated until the final molding and assembling operation.

Prior to the placement of the cushioning material 18 the cushioning material both top and bottom and the upper surface 19 of the base 3 as well as the interior of the depending flange 4 may be coated with a heat activated or pressure sensitive adhesive.

In operation, the vacuum forming machine is loaded with the seat base 3 in the position shown in FIG. 1 with the carriage bolt 7 projecting down through the aligned apertures 6 providing an air passage through the bottom of the base. The cushion material 18 is then placed on top of the seat base and both the cushion material and the base are coated with adhesive as noted above. The sheet of cover material is then loaded in the clamping platen and preheated for formability. The platen is then placed on the machine to create the vacuum seal.

Now moving to FIG. 2, vacuum is created within the machine and the external pressure forces the cover material as well as the cushion material to the condition shown pulling the cover over the seat base and cushion material simultaneously bonding the same in position. As noted, the configuration of the male pedestal and the filler plate 11 draws the sheet material 17 radially inwardly beneath the depending flange 4 as indicated at 21. Such sheet material is drawn against the male mold pedestal as shown at 22 and, of course, down against the filler plate 11 as shown at 23. The vacuum created within the machine draws the cover 17 and, of course, the cushioning material 18 against the base 3 to form the same while the configuration of the filler plate 11 and the male mold pedestal 1 draws the sheet material radially underneath the depending flange 4 assembling the components as shown.

The platen clamps are now removed and the unit is withdrawn from the machine and turned upside down as indicated in FIG. 3. A trimming tool shown in phantom lines at 25 is employed to trim the excess sheet material 17 adjacent the corner formed by the periphery of the male mold pedestal 1 as indicated at 26. The projecting edge 27 of the cover material remaining after the trimming operation is now simply folded against the inside of the depending flange 4 and adhesively secured in place by the adhesive previously applied. The downwardly projecting edge or flange 4 is thus covered by the sheet material 17 and a neat appearing seat is provided securely assembled having a life which is that of the materials employed.

Accordingly, the entire unit is upholstered automatically during the vacuum forming operation and such upholstering not only shapes the cover and cushioning material, but assembles the same by providing the locking inwardly directed portion of the cover sheet material 21 beneath the depending flange 4. The only component of the seat which is preformed is the base itself since both the cover and the cushion are applied and shaped directly to the base by the use of the vacuum.

Other modes of applying the principles of the invention may be employed, change being made as regards the details described, provided the features stated in any of the following claims or the equivalent of such be employed.

We, therefore, particularly point out and distinctly claim as our invention:

1. A seat having a base with at least one air passage therethrough and a depending flange around the periphery of said base, porous cushioning material on said base, and a cover vacuum formed over said cushioning material and said depending flange for shaping said cover and cushioning material and locking said cover to said base, said cushioning material and base having been pre-coated with an adhesive, whereby said cushioning material, cover and base are bonded together during such vacuum forming.

2. A seat as set forth in claim 1 wherein the edge of said cover is adhesively secured to the inner surface of said depending flange.

3. A seat as set forth in claim 1 wherein said cover comprises a thermo-formable vinyl sheet material.

4. A seat as set forth in claim 1 including a carriage bolt projecting through said base, the hole in which said bolt is situated being said air passage.

5. A method of producing a seat comprising the steps of coating a seat base with adhesive, coating a layer of cushioning material with adhesive, placing such cushioning material on such base, such base having at least one air passage therethrough and a depending flange around the periphery of the base, and vacuum forming a cover over such cushioning material and depending flange to shape the cover and cushioning material and lock the cover to the base.

6. A method as set forth in claim 5 wherein such vacuum forming folds such cover under the peripheral edge of such seat base to assemble the cover, cushioning material and base when shaped.

7. A method as set forth in claim 6 including trimming the folded under edge of such cover and adhesively securing such trimmed edge to the underside of the peripheral edge of such seat base.

8. A method as set forth in claim 5 including placing such seat base with such cushioning material thereon on a pedestal in a vacuum forming machine with the edge of such seat base projecting laterally beyond such pedestal prior to the vacuum forming step.

9. A method as set forth in claim 8 including preheating such cover, and draping such cover over such base and cushioning material thereon while heated.

References Cited

UNITED STATES PATENTS

| | | | |
|---|---|---|---|
| 2,208,745 | 7/1940 | Bloomberg | 297—459 |
| 2,248,413 | 7/1941 | Rathbun | 297—459 |
| 2,285,925 | 6/1942 | Handy | 297—459 X |
| 2,347,538 | 4/1944 | Bloomberg | 297—459 |
| 3,208,085 | 9/1965 | Grimshaw | 5—345 |
| 3,264,034 | 8/1966 | Lawson | 297—458 X |
| 3,273,178 | 9/1966 | Baruth et al. | 5—352.2 |
| 3,281,185 | 10/1966 | Albinson et al. | 297—452 |
| 3,341,251 | 9/1967 | Costin | 297—452 |

CASMIR A. NUNBERG, *Primary Examiner.*

U.S. Cl. X.R.

254—90; 297—452